(12) United States Patent
Turk

(10) Patent No.: US 9,701,246 B2
(45) Date of Patent: *Jul. 11, 2017

(54) VEHICLE VISION SYSTEM USING KINEMATIC MODEL OF VEHICLE MOTION

(71) Applicant: MAGNA ELECTRONICS INC., Auburn Hills, MI (US)

(72) Inventor: James Turk, Oakville (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/960,834

(22) Filed: Dec. 7, 2015

(65) Prior Publication Data

US 2016/0082887 A1  Mar. 24, 2016

Related U.S. Application Data

(63) Continuation of application No. 14/282,029, filed on May 20, 2014, now Pat. No. 9,205,776.
(Continued)

(51) Int. Cl.
*G05D 1/02* (2006.01)
*B60R 1/00* (2006.01)

(52) U.S. Cl.
CPC .......... *B60R 1/00* (2013.01); *B60R 2300/105* (2013.01); *B60R 2300/30* (2013.01); *B60R 2300/402* (2013.01); *B60R 2300/802* (2013.01)

(58) Field of Classification Search
CPC .......... G06G 7/78; G01S 1/02; G01S 13/931; G01C 21/22
(Continued)

(56) References Cited

U.S. PATENT DOCUMENTS 4,961,625 A  10/1990 Wood et al.
4,966,441 A  10/1990 Conner
(Continued)

FOREIGN PATENT DOCUMENTS

EP  0353200  1/1990
EP  0361914  2/1993
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Gertrude Arthur Jeanglaude
(74) *Attorney, Agent, or Firm* — Gardner, Linn, Burkhart & Flory, LLP

(57) ABSTRACT

A vision system for a vehicle includes a plurality of cameras disposed at the vehicle and respective fields of view exterior of the vehicle. An electronic control unit includes an image processor operable to process image data captured by any or all of the cameras. Responsive to image processing of captured image data, the electronic control unit is operable to determine objects present in the field of view of at least one of the cameras. Responsive to vehicle data, the electronic control unit determines a vehicle motion vector during driving of the vehicle by a driver of the vehicle. The electronic control unit compares the determined relative movement of a determined object to the determined vehicle motion vector and, responsive to a difference between the determined relative movement of the object and the determined vehicle motion vector, the electronic control unit determines a misalignment of the at least one camera.

27 Claims, 4 Drawing Sheets

Related U.S. Application Data

(60) Provisional application No. 61/825,753, filed on May 21, 2013.

(58) Field of Classification Search
USPC ..... 701/301, 400, 409, 410; 340/425.5, 988, 340/435, 436, 438
See application file for complete search history.

(56) References Cited

U.S. PATENT DOCUMENTS

| | | | |
|---|---|---|---|
| 4,967,319 A | 10/1990 | Seko | |
| 4,970,653 A | 11/1990 | Kenue | |
| 5,003,288 A | 3/1991 | Wilhelm | |
| 5,059,877 A | 10/1991 | Teder | |
| 5,064,274 A | 11/1991 | Alten | |
| 5,072,154 A | 12/1991 | Chen | |
| 5,096,287 A | 3/1992 | Kakinami et al. | |
| 5,148,014 A | 9/1992 | Lynam | |
| 5,166,681 A | 11/1992 | Bottesch et al. | |
| 5,177,606 A | 1/1993 | Koshizawa | |
| 5,182,502 A | 1/1993 | Slotkowski et al. | |
| 5,193,029 A | 3/1993 | Schofield | |
| 5,204,778 A | 4/1993 | Bechtel | |
| 5,208,701 A | 5/1993 | Maeda | |
| 5,208,750 A | 5/1993 | Kurami et al. | |
| 5,214,408 A | 5/1993 | Asayama | |
| 5,243,524 A | 9/1993 | Ishida et al. | |
| 5,245,422 A | 9/1993 | Borcherts et al. | |
| 5,276,389 A | 1/1994 | Levers | |
| 5,289,321 A | 2/1994 | Secor | |
| 5,305,012 A | 4/1994 | Faris | |
| 5,307,136 A | 4/1994 | Saneyoshi | |
| 5,351,044 A | 9/1994 | Mathur et al. | |
| 5,355,118 A | 10/1994 | Fukuhara | |
| 5,386,285 A | 1/1995 | Asayama | |
| 5,406,395 A | 4/1995 | Wilson et al. | |
| 5,408,346 A | 4/1995 | Trissel et al. | |
| 5,414,461 A | 5/1995 | Kishi et al. | |
| 5,426,294 A | 6/1995 | Kobayashi et al. | |
| 5,430,431 A | 7/1995 | Nelson | |
| 5,434,407 A | 7/1995 | Bauer et al. | |
| 5,440,428 A | 8/1995 | Hegg et al. | |
| 5,444,478 A | 8/1995 | Lelong et al. | |
| 5,451,822 A | 9/1995 | Bechtel et al. | |
| 5,469,298 A | 11/1995 | Suman et al. | |
| 5,530,420 A | 6/1996 | Tsuchiya et al. | |
| 5,535,144 A | 7/1996 | Kise | |
| 5,535,314 A | 7/1996 | Alves et al. | |
| 5,537,003 A | 7/1996 | Bechtel et al. | |
| 5,539,397 A | 7/1996 | Asanuma et al. | |
| 5,550,677 A | 8/1996 | Schofield et al. | |
| 5,555,555 A | 9/1996 | Sato et al. | |
| 5,568,027 A | 10/1996 | Teder | |
| 5,574,443 A | 11/1996 | Hsieh | |
| 5,648,835 A | 7/1997 | Uzawa | |
| 5,661,303 A | 8/1997 | Teder | |
| 5,670,935 A | 9/1997 | Schofield et al. | |
| 5,699,044 A | 12/1997 | Van Lente et al. | |
| 5,724,316 A | 3/1998 | Brunts | |
| 5,737,226 A | 4/1998 | Olson et al. | |
| 5,757,949 A | 5/1998 | Kinoshita et al. | |
| 5,760,826 A | 6/1998 | Nayar | |
| 5,760,962 A | 6/1998 | Schofield et al. | |
| 5,761,094 A | 6/1998 | Olson et al. | |
| 5,765,116 A | 6/1998 | Wilson-Jones et al. | |
| 5,781,437 A | 7/1998 | Wiemer et al. | |
| 5,786,772 A | 7/1998 | Schofield et al. | |
| 5,790,403 A | 8/1998 | Nakayama | |
| 5,790,973 A | 8/1998 | Blaker et al. | |
| 5,796,094 A | 8/1998 | Schofield et al. | |
| 5,837,994 A | 11/1998 | Stam et al. | |
| 5,845,000 A | 12/1998 | Breed et al. | |
| 5,848,802 A | 12/1998 | Breed et al. | |
| 5,850,176 A | 12/1998 | Kinoshita et al. | |
| 5,850,254 A | 12/1998 | Takano et al. | |
| 5,867,591 A | 2/1999 | Onda | |
| 5,877,707 A | 3/1999 | Kowalick | |
| 5,877,897 A | 3/1999 | Schofield et al. | |
| 5,878,370 A | 3/1999 | Olson | |
| 5,896,085 A | 4/1999 | Mori et al. | |
| 5,920,367 A | 7/1999 | Kajimoto et al. | |
| 5,923,027 A | 7/1999 | Stam et al. | |
| 5,929,786 A | 7/1999 | Schofield et al. | |
| 5,956,181 A | 9/1999 | Lin | |
| 6,049,171 A | 4/2000 | Stam et al. | |
| 6,052,124 A | 4/2000 | Stein et al. | |
| 6,066,933 A | 5/2000 | Ponziana | |
| 6,084,519 A | 7/2000 | Coulling et al. | |
| 6,091,833 A | 7/2000 | Yasui et al. | |
| 6,097,024 A | 8/2000 | Stam et al. | |
| 6,100,811 A | 8/2000 | Hsu et al. | |
| 6,175,300 B1 | 1/2001 | Kendrick | |
| 6,198,409 B1 | 3/2001 | Schofield et al. | |
| 6,201,642 B1 | 3/2001 | Bos | |
| 6,222,447 B1 | 4/2001 | Schofield et al. | |
| 6,226,061 B1 | 5/2001 | Tagusa | |
| 6,259,423 B1 | 7/2001 | Tokito et al. | |
| 6,266,082 B1 | 7/2001 | Yonezawa et al. | |
| 6,266,442 B1 | 7/2001 | Laumeyer et al. | |
| 6,285,393 B1 | 9/2001 | Shimoura et al. | |
| 6,285,778 B1 | 9/2001 | Nakajima et al. | |
| 6,294,989 B1 | 9/2001 | Schofield et al. | |
| 6,297,781 B1 | 10/2001 | Turnbull et al. | |
| 6,302,545 B1 | 10/2001 | Schofield et al. | |
| 6,310,611 B1 | 10/2001 | Caldwell | |
| 6,313,454 B1 | 11/2001 | Bos et al. | |
| 6,317,057 B1 | 11/2001 | Lee | |
| 6,320,176 B1 | 11/2001 | Schofield et al. | |
| 6,320,282 B1 | 11/2001 | Caldwell | |
| 6,353,392 B1 | 3/2002 | Schofield et al. | |
| 6,370,329 B1 | 4/2002 | Teuchert | |
| 6,396,397 B1 | 5/2002 | Bos et al. | |
| 6,411,204 B1 | 6/2002 | Bloomfield et al. | |
| 6,424,273 B1 | 7/2002 | Gutta et al. | |
| 6,445,287 B1 | 9/2002 | Schofield et al. | |
| 6,477,464 B2 | 11/2002 | McCarthy et al. | |
| 6,498,620 B2 | 12/2002 | Schofield et al. | |
| 6,515,378 B2 | 2/2003 | Drummond et al. | |
| 6,516,664 B2 | 2/2003 | Lynam | |
| 6,523,964 B2 | 2/2003 | Schofield et al. | |
| 6,553,130 B1 | 4/2003 | Lemelson et al. | |
| 6,559,435 B2 | 5/2003 | Schofield et al. | |
| 6,570,998 B1 | 5/2003 | Ohtsuka et al. | |
| 6,574,033 B1 | 6/2003 | Chui et al. | |
| 6,578,017 B1 | 6/2003 | Ebersole et al. | |
| 6,587,573 B1 | 7/2003 | Stam et al. | |
| 6,589,625 B1 | 7/2003 | Kothari et al. | |
| 6,593,011 B2 | 7/2003 | Liu et al. | |
| 6,593,565 B2 | 7/2003 | Heslin et al. | |
| 6,593,698 B2 | 7/2003 | Stam et al. | |
| 6,594,583 B2 | 7/2003 | Ogura et al. | |
| 6,611,202 B2 | 8/2003 | Schofield et al. | |
| 6,611,610 B1 | 8/2003 | Stam et al. | |
| 6,627,918 B2 | 9/2003 | Getz et al. | |
| 6,631,316 B2 | 10/2003 | Stam et al. | |
| 6,631,994 B2 | 10/2003 | Suzuki et al. | |
| 6,636,258 B2 | 10/2003 | Strumolo | |
| 6,648,477 B2 | 11/2003 | Hutzel et al. | |
| 6,650,233 B2 | 11/2003 | DeLine et al. | |
| 6,650,455 B2 | 11/2003 | Miles | |
| 6,672,731 B2 | 1/2004 | Schnell et al. | |
| 6,674,562 B1 | 1/2004 | Miles | |
| 6,678,056 B2 | 1/2004 | Downs | |
| 6,678,614 B2 | 1/2004 | McCarthy et al. | |
| 6,680,792 B2 | 1/2004 | Miles | |
| 6,690,268 B2 * | 2/2004 | Schofield | B60C 23/00 340/425.5 |
| 6,700,605 B1 | 3/2004 | Toyoda et al. | |
| 6,703,925 B2 | 3/2004 | Steffel | |
| 6,704,621 B1 | 3/2004 | Stein et al. | |
| 6,710,908 B2 | 3/2004 | Miles et al. | |
| 6,711,474 B1 | 3/2004 | Treyz et al. | |
| 6,714,331 B2 | 3/2004 | Lewis et al. | |
| 6,717,610 B1 | 4/2004 | Bos et al. | |

(56) References Cited

U.S. PATENT DOCUMENTS

| | | | |
|---|---|---|---|
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,864,930 B2 | 3/2005 | Matsushita et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,195,381 B2 | 3/2007 | Lynam et al. |
| 7,202,776 B2 | 4/2007 | Breed |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,821 B2 | 9/2008 | Bechtel et al. |
| 7,425,076 B2 | 9/2008 | Schofield et al. |
| 7,446,650 B2 * | 11/2008 | Scholfield | B60C 23/00 340/425.5 |
| 7,526,103 B2 | 4/2009 | Schofield et al. |
| 7,532,109 B2 | 5/2009 | Takahama et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,566,851 B2 | 7/2009 | Stein et al. |
| 7,605,856 B2 | 10/2009 | Imoto |
| 7,616,781 B2 | 11/2009 | Schofield et al. |
| 7,619,508 B2 | 11/2009 | Lynam et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,877,175 B2 | 1/2011 | Higgins-Luthman |
| 7,881,496 B2 | 2/2011 | Camilleri |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,486 B2 | 5/2011 | Denny et al. |
| 7,991,522 B2 | 8/2011 | Higgins-Luthman |
| 7,994,462 B2 | 8/2011 | Schofield et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,095,310 B2 | 1/2012 | Taylor et al. |
| 8,098,142 B2 | 1/2012 | Schofield et al. |
| 8,100,568 B2 | 1/2012 | DeLine et al. |
| 8,164,628 B2 | 4/2012 | Stein et al. |
| 8,203,440 B2 | 6/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,314,689 B2 | 11/2012 | Schofield et al. |
| 8,378,851 B2 | 2/2013 | Stein et al. |
| 8,421,865 B2 | 4/2013 | Euler et al. |
| 8,452,055 B2 | 5/2013 | Stein et al. |
| 8,534,887 B2 | 9/2013 | DeLine et al. |
| 8,553,088 B2 | 10/2013 | Stein et al. |
| 8,643,724 B2 | 2/2014 | Schofield et al. |
| 8,692,659 B2 | 4/2014 | Schofield et al. |
| 9,205,776 B2 | 12/2015 | Turk |
| 9,264,672 B2 * | 2/2016 | Lynam |
| 2002/0005778 A1 | 1/2002 | Breed |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0032321 A1 | 2/2004 | McMahon et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Widmann et al. |
| 2007/0024724 A1 | 2/2007 | Stein et al. |
| 2007/0104476 A1 | 5/2007 | Yasutomi et al. |
| 2007/0109406 A1 | 5/2007 | Schofield et al. |
| 2007/0120657 A1 | 5/2007 | Schofield et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2012/0320209 A1 | 12/2012 | Vico |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0022378 A1 | 1/2014 | Higgins-Luthman |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0160291 A1 * | 6/2014 | Schaffner | B60R 1/00 348/148 |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |

FOREIGN PATENT DOCUMENTS

| | | |
|---|---|---|
| EP | 0640903 | 3/1995 |
| EP | 0697641 | 2/1996 |
| EP | 1115250 | 7/2001 |
| EP | 2377094 | 10/2011 |

(56) References Cited

FOREIGN PATENT DOCUMENTS

| | | |
|---|---|---|
| EP | 2667325 | 11/2013 |
| GB | 2233530 | 9/1991 |
| JP | S5539843 | 3/1980 |
| JP | S58110334 | 6/1983 |
| JP | 6216073 | 4/1987 |
| JP | 6272245 | 5/1987 |
| JP | S62-131837 | 6/1987 |
| JP | 01123587 | 5/1989 |
| JP | H1168538 | 7/1989 |
| JP | H236417 | 8/1990 |
| JP | 3099952 | 4/1991 |
| JP | 03099952 | 4/1991 |
| JP | 6227318 | 8/1994 |
| JP | 07105496 | 4/1995 |
| JP | 2630604 | 7/1997 |
| JP | 200274339 | 3/2002 |
| JP | 20041658 | 1/2004 |
| WO | WO9419212 | 2/1994 |
| WO | WO9638319 | 12/1996 |
| WO | WO2012139636 | 10/2012 |
| WO | WO2012139660 | 10/2012 |
| WO | WO2012143036 | 10/2012 |

OTHER PUBLICATIONS

Behringer et al., "Simultaneous Estimation of Pitch Angle and Lane Width from the Video Image of a Marked Road," pp. 966-973, Sep. 12-16, 1994.

Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Broggi et al., "Automatic Vehicle Guidance: The Experience of the ARGO Vehicle", World Scientific Publishing Co., 1999.

Broggi et al., "Multi-Resolution Vehicle Detection using Artificial Vision," IEEE Intelligent Vehicles Symposium of Jun. 2004.

Franke et al., "Autonomous driving approaches downtown", Intelligent Systems and Their Applications, IEEE 13 (6), 40-48, Nov./Dec. 1999.

IEEE 100—The Authoritative Dictionary of IEEE Standards Terms, 7th Ed. (2000).

Kastrinaki et al., "A survey of video processing techniques for traffic applications".

Philomin et al., "Pedestrain Tracking from a Moving Vehicle".

Sahli et al., "A Kalman Filter-Based Update Scheme for Road Following," IAPR Workshop on Machine Vision Applications, pp. 5-9, Nov. 12-14, 1996.

Sun et al., "On-road vehicle detection using optical sensors: a review", IEEE Conference on Intelligent Transportation Systems, 2004.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Van Leeuwen et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Vlacic et al. (Eds), "Intelligent Vehicle Tecnologies, Theory and Applications", Society of Automotive Engineers Inc., edited by SAE International, 2001.

Zheng et al., "An Adaptive System for Traffic Sign Recognition," IEEE Proceedings of the Intelligent Vehicles '94 Symposium, pp. 165-170 (Oct. 1994).

\* cited by examiner

VEHICLE VISION SYSTEM USING KINEMATIC MODEL OF VEHICLE MOTION

CROSS REFERENCE TO RELATED APPLICATIONS

The present application is a continuation of U.S. patent application Ser. No. 14/282,029, filed May 20, 2014, now U.S. Pat. No. 9,205,776, which claims the filing benefits of U.S. provisional application Ser. No. 61/825,753, filed May 21, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (such as one or more CMOS cameras) to capture image data representative of images exterior of the vehicle, and determines a kinematic model of motion of the vehicle as the vehicle is driven along any path or route. The system determines the kinematic model based on inputs indicative of the vehicle steering angle and/or vehicle speed and/or vehicle geometries.

The cameras (such as one or more CMOS cameras) capture image data representative of images exterior of the vehicle, and provide the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle.

According to an aspect of the present invention, a vision system of a vehicle includes at least one camera (such as a camera comprising a two dimensional array of photosensing pixels) disposed at the vehicle and having a field of view exterior of the vehicle (and may include a plurality of cameras, each having a respective field of view exterior of the vehicle, such as rearward, sideward and/or forward of the vehicle). The camera is operable to capture frames of image data. Responsive to image processing by an image processor of captured image data, a control is operable to determine objects present in the field of view of the camera. Responsive to vehicle data (such as steering information of the vehicle, speed of the vehicle and/or distance traveled by the vehicle or the like), the control determines a vehicle motion vector during driving of the vehicle by a driver of the vehicle. The control determines movement of an object (present in the field of view of the at least one camera) relative to the vehicle via image processing of at least two frames of captured image data during driving of the vehicle by the driver of the vehicle. The control compares the determined relative movement of the object to the determined vehicle motion vector, and responsive to the comparison, the control may determine a misalignment of the camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
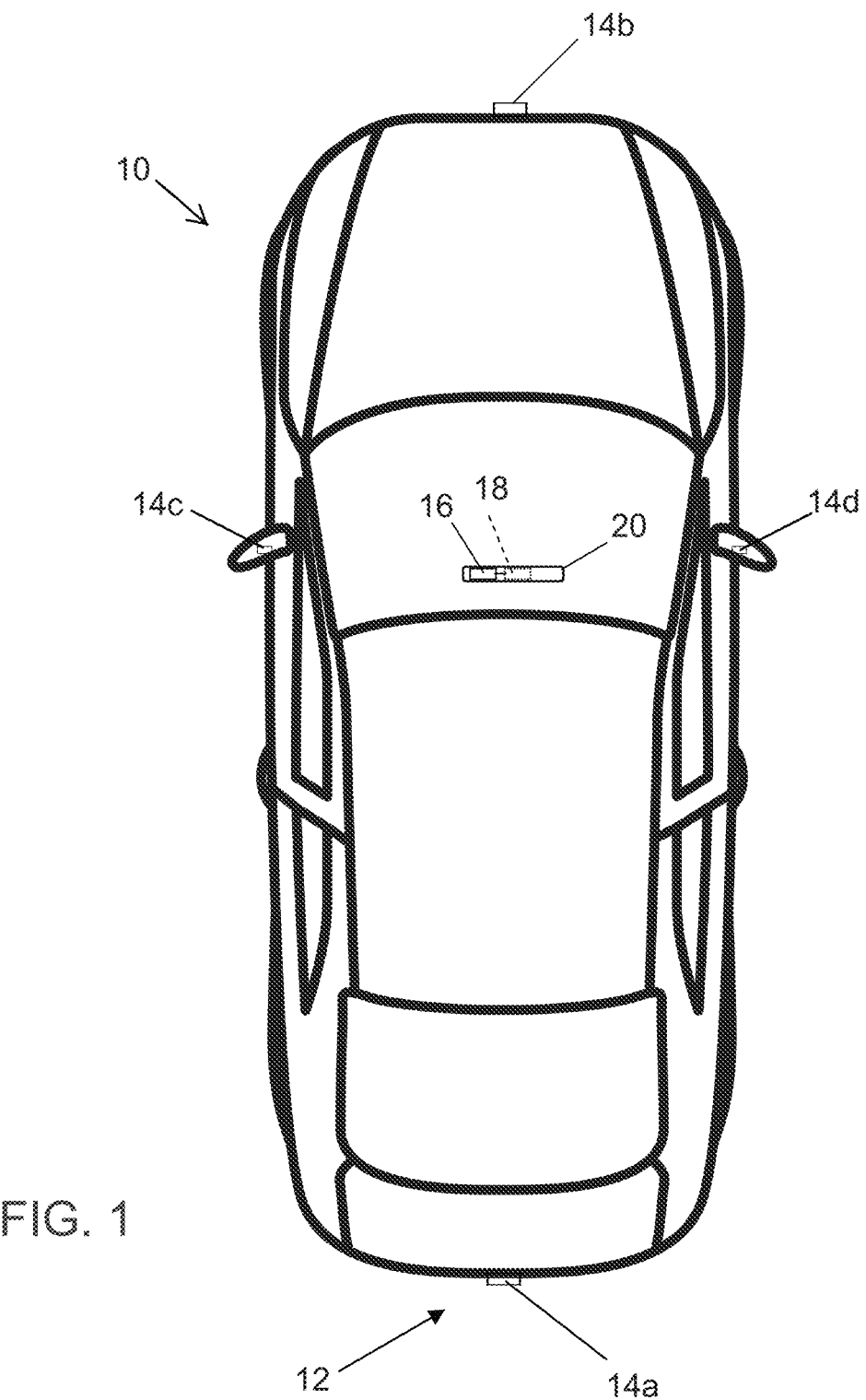
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The cameras operate to capture frames of image data at a desired or selected frame rate, such as, for example, about 30 frames per second or more or less. The data transfer or signal communication from the camera to the ECU may comprise any suitable data or communication link, such as a vehicle network bus or the like of the equipped vehicle.

The kinematic model of the present invention generates a Motion Vector $V_{1N}=(x_{1N}, y_{1N}, \psi_{1N})$ of a moving vehicle between frame 1 and frame N, where $x_{1N}$ and $y_{1N}$ (mm) are the translational components of V and $\psi_{1N}$ (degrees) is the heading angle of the vehicle. No specific vehicle motion is required, whereby the Motion Vector estimation is performed as the vehicle navigates along an arbitrary path.

The Kinematic Model of the present invention uses a "Bicycle Model" to represent the vehicle motion, and determines or computes elementary vectors $V_{ij}=(x_{ij}, y_{ij}, \psi_{ij})$ for each pair of frames i and j. The resulting motion vector is composed of elementary vectors.

The Kinematic Model of the present invention does not use any image information, and the inputs of the Kinematic Model include vehicle CAN bus data and vehicle geometry.

Figure 2:
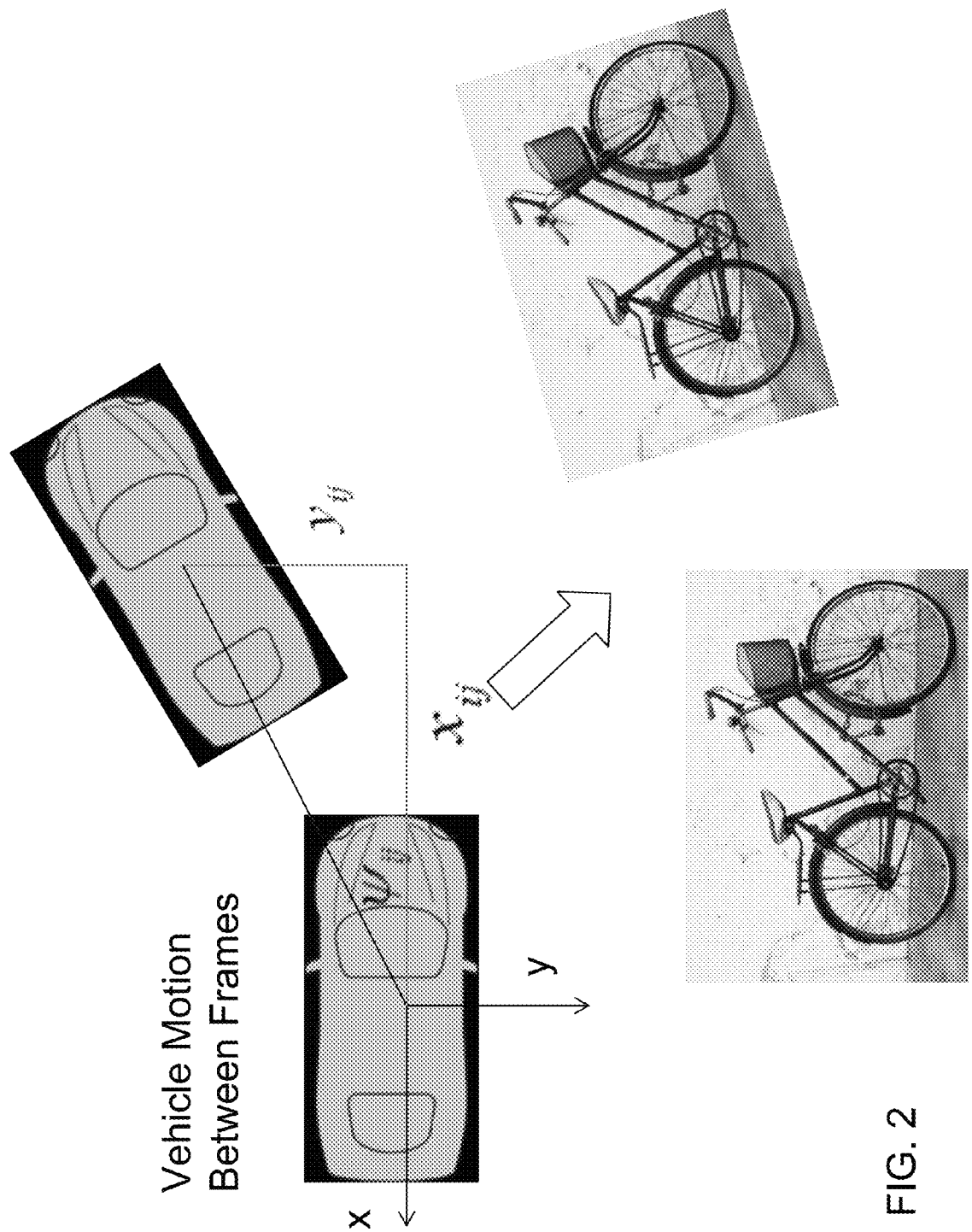
FIG. 2 is a schematic showing the coordinate system and angles used to represent the travel of the vehicle.

The kinematic model of the present invention develops numerical relations between wheel steering angles, wheel pulses, heading angle $\psi_{ij}$ and translational vehicle motion between frames i and j. The system is operable to approximate the vehicle Kinematic Model by use of a bicycle kinematic model, where two front (and rear) wheels coincide (see, for example, FIG. 2). Experiments show that vehicle motion (such as four wheel vehicles, such as cars, vans, SUVs, trucks and/or the like) can be accurately described by such a bicycle kinematic model.

Figure 3:
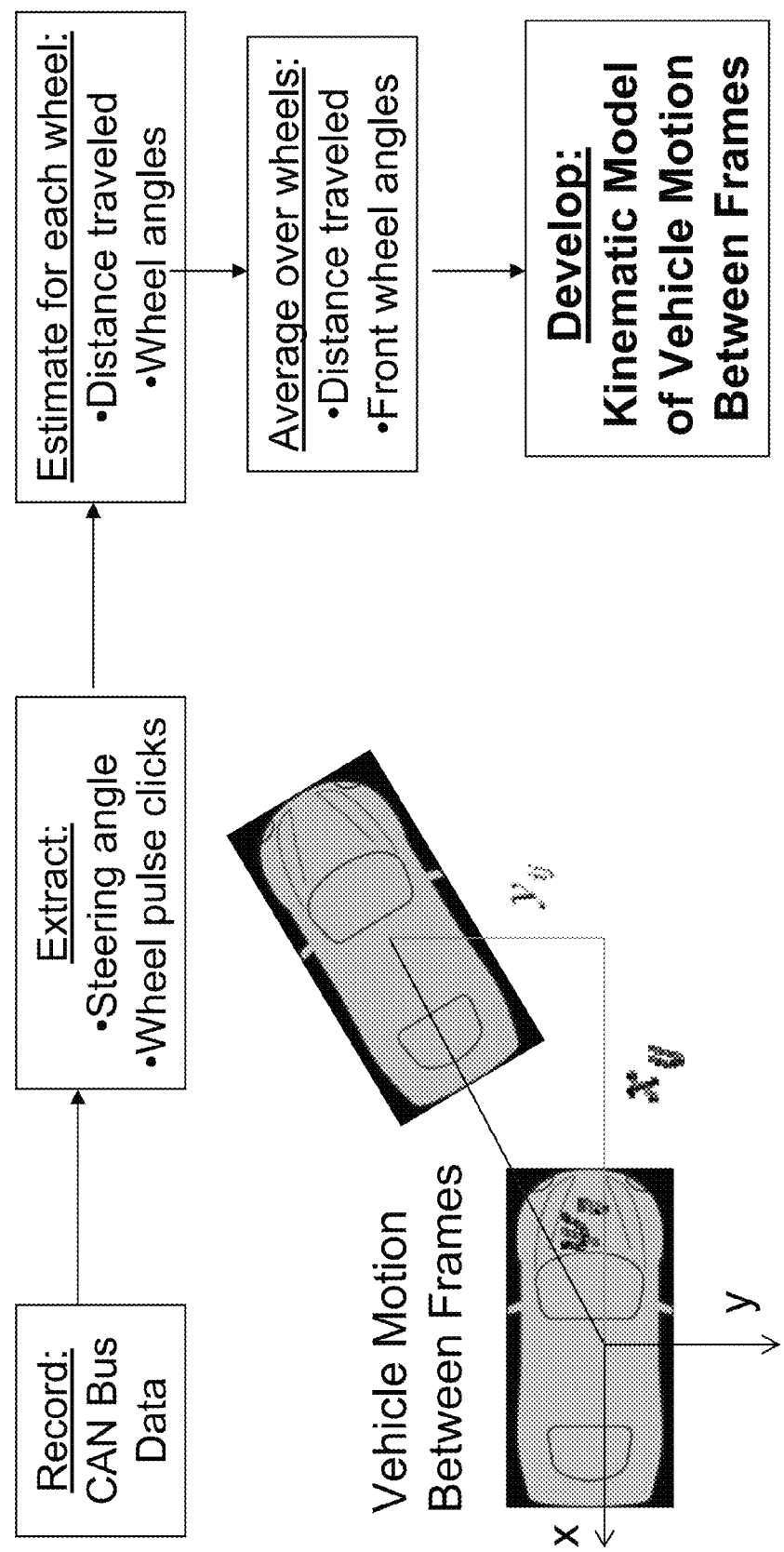
FIG. 3 is a schematic and block diagram of the system of the present invention.

The Kinematic Model of the present invention provides a model of vehicle motion between frames, based on one or more system inputs. The system is operable to estimate a vector $V_{ij}=(x_{ij}, y_{ij}, \psi_{ij})$ of vehicle motion between image frames i and j. The inputs may provide input data, such as, for example, CAN bus vehicle motion data, such as, for example, the steering wheel angle and wheel pulse clicks and/or the like (see FIG. 3).

Figure 4:
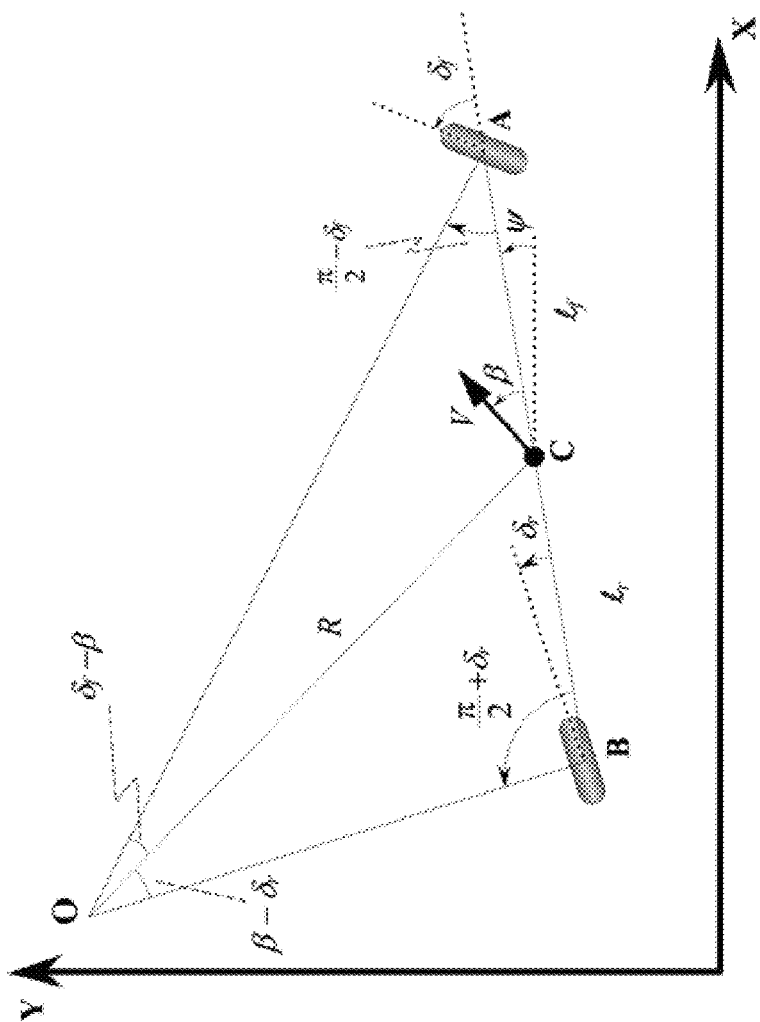
FIG. 4 is a model of the kinematic equations of the system of the present invention.

The kinematic modeling system of the present invention uses lateral vehicle dynamics and wheel pulse counters, and develops numerical relations between the wheel steering angles, the heading angle and the translational vehicle motion. The system uses the assumption that the motion of the vehicle can be accurately described by a Bicycle Model, where the two front and two rear wheels coincide (see FIG. 4).

The system of the present invention thus may determine a model of the motion or path of the vehicle responsive to vehicle system inputs, such as inputs from or indicative of the vehicle steering wheel angle and/or vehicle speed and/or the like. The system may utilize the motion model for camera calibration systems and/or the like, such as for a camera calibration system of the types described in U.S. patent application Ser. No. 14/282,028, filed May 20, 2014 and published Nov. 27, 2014 as U.S. Publication No. US-2014-0347486, and U.S. provisional applications, Ser. No. 61/878,877, filed Sep. 17, 2013, and Ser. No. 61/825,752, filed May 21, 2013, which are hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011 and published Jun. 28, 2012 as U.S. Publication No. US-2012-0162427, which are hereby incorporated herein by reference in their entireties.

In multi-camera surround view systems, maintaining calibration of the cameras is important. For example, a camera located at the outside mirror should be calibrated along with a camera located at the front or rear of the vehicle, so that the overlapping portions of the captured images can be properly stitched together to provide a substantially seamless top view or surround view display. Prior calibration methods are known, such as described in U.S. Pat. No. 7,720,580, which is hereby incorporated herein by reference in its entirety.

In accordance with the present invention, a vehicle data-based kinematic model of the equipped vehicle is determined as that vehicle travels a particular road or route, using vehicle data, such as including vehicle steering information, vehicle speed information, vehicle distance information and/or the like. Such vehicle data is supplied to a control (typically vehicle a CAN or LIN bus of the vehicle), which determines or establishes a vehicle-based motion vector for the vehicle at any given time and location along the driven route. In parallel (such as at the same time as the kinematic model is being determined), an image-based motion vector of that moving vehicle may be determined, based on change or movement of an imaged object between a first frame and a following or subsequent second frame.

In a properly calibrated system, movement of the equipped vehicle and objects in the field of view of the camera as determined via image processing of captured image data should coincide with and be the same as movement of the vehicle determined and predicted via the vehicle data based kinematic model. In other words, the kinematic model can be used to determine how an object present in the field of view of the camera may move relative to the vehicle as the vehicle is driven, and when the camera is properly calibrated, the location and movement of the object as determined via image processing of subsequent frames of captured image data should coincide with the predicted location and movement of the object as determined via use of the kinematic model. However, if a particular camera capturing image data processed in the first and second frames of captured image data is no longer properly calibrated, the motion of the object predicted by use of the vehicle kinematic vector determined by the vehicle data based kinematic model will be different than the relative motion of the object in the field of view of the misaligned camera as captured over two or more frames of image data. Thus, the control can determine and utilize this determined difference to establish or determine that an out of calibration condition of the subject vehicle camera exists. Responsive to such a determination, the system may adjust the camera calibration accordingly to bring the camera into calibration so as to have the location and relative movement of detected objects coincide with the predicted location and movement based on the actual kinematic/orientation of the equipped vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/1581 67; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011 and published Mar. 15, 2012 as U.S. Publication No. US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:

a plurality of cameras disposed at a vehicle equipped with said vision system;

said plurality of cameras comprising at least (i) a first camera disposed at a rear portion of the equipped vehicle, (ii) a second camera disposed at a driver side portion of the equipped vehicle and (iii) a third camera disposed at a passenger side of the equipped vehicle;

wherein each of said first, second and third cameras has a respective field of view exterior of the equipped vehicle;

wherein each of said first, second and third cameras is operable to capture frames of image data;

an electronic control unit, said electronic control unit comprising an image processor operable to process image data captured by any or all of said first, second and third cameras;

wherein, responsive to image processing by said image processor of captured image data, said electronic control unit is operable to determine objects present in the field of view of at least one of said first, second and third cameras;

wherein, responsive to vehicle data, said electronic control unit determines a vehicle motion vector during driving of the equipped vehicle by a driver of the equipped vehicle;

wherein the vehicle data includes steering information of the equipped vehicle and at least one of (i) speed of the equipped vehicle and (ii) distance traveled by the equipped vehicle;

wherein, during driving of the equipped vehicle by the driver of the equipped vehicle, said electronic control unit determines movement of an object relative to the equipped vehicle via image processing by said image processor of at least two frames of image data captured by said at least one of said first, second and third cameras;

wherein said electronic control unit compares the determined relative movement of the object to the determined vehicle motion vector;

wherein, responsive to a difference between the determined relative movement of the object and the determined vehicle motion vector, said electronic control unit determines a misalignment of said at least one of said first, second and third cameras; and wherein image data captured by cameras of said plurality of cameras is used by a surround view system of the equipped vehicle.

2. The vision system of claim 1, wherein the vehicle data is communicated to the electronic control unit via a communication bus of the equipped vehicle.

3. The vision system of claim 1, wherein a kinematic model comprising a bicycle model is used by said electronic control unit to represent vehicle motion.

4. The vision system of claim 3, wherein said kinematic model utilizes at least one of (i) a wheel steering angle of the equipped vehicle, (ii) a wheel pulse of the equipped vehicle, (iii) a heading angle of the equipped vehicle and (iv) translational vehicle motion of the equipped vehicle.

5. The vision system of claim 1, wherein the vehicle data includes geometry of the equipped vehicle.

6. The vision system of claim 1, wherein, responsive to a determined misalignment of said at least one of said first, second and third cameras, said electronic control unit is operable to calibrate said at least one of said first, second and third cameras.

7. The vision system of claim 1, wherein said electronic control unit compares the determined vehicle motion vector to an object vector determined between a first position of the object in a first frame of image data captured by said at least one of said first, second and third cameras and a second position of the object in a second frame of image data captured by said at least one of said first, second and third cameras.

8. The vision system of claim 7, wherein said electronic control unit determines a misalignment of said at least one of said first, second and third cameras responsive to a difference between a direction or magnitude of the determined vehicle motion vector and a direction or magnitude of the determined object vector.

9. The vision system of claim 1, wherein the vehicle data is communicated to the electronic control unit via a CAN communication bus of the equipped vehicle.

10. The vision system of claim 9, wherein the vehicle data includes geometry of the equipped vehicle.

11. The vision system of claim 1, wherein the field of view of said first camera comprises a field of view rearward of the equipped vehicle, and wherein the field of view of said second camera comprises a field of view sideward of the driver side of the equipped vehicle, and wherein the field of view of said third camera comprises a field of view sideward of the passenger side of the equipped vehicle.

12. The vision system of claim 11, wherein said at least one of said first, second and third cameras comprises said second camera and wherein said second camera is disposed at a driver side exterior rearview mirror assembly of the equipped vehicle.

13. The vision system of claim 12, wherein said second camera comprises a photosensor array having at least 1 million CMOS photosensor elements arranged in rows and columns.

14. The vision system of claim 12, wherein said at least one of said first, second and third cameras comprises said first camera, and wherein said electronic control unit is operable to stitch together image data captured at least by said first and second cameras to form a substantially seamless birds-eye view for display by a display screen of the equipped vehicle for viewing by the driver of the equipped vehicle when operating the equipped vehicle.

15. The vision system of claim 14, wherein said plurality of cameras comprises a fourth camera disposed at a front portion of the equipped vehicle, said fourth camera having a field of view exterior of the equipped vehicle, wherein the field of view of said fourth camera comprises a field of view forward of the equipped vehicle, wherein said fourth camera is operable to capture frames of image data, and wherein said image processor of said electronic control unit is operable to process image data captured by said fourth camera.

16. A vision system for a vehicle, said vision system comprising:

a plurality of cameras disposed at a vehicle equipped with said vision system;

said plurality of cameras comprising at least (i) a first camera disposed at a rear portion of the equipped vehicle, (ii) a second camera disposed at a driver side portion of the equipped vehicle, (iii) a third camera disposed at a passenger side of the equipped vehicle and (iv) a fourth camera disposed at a front portion of the equipped vehicle;

wherein each of said first, second, third and fourth cameras has a respective field of view exterior of the equipped vehicle;

wherein each of said first, second, third and fourth cameras is operable to capture frames of image data;

an electronic control unit, said electronic control unit comprising an image processor operable to process image data captured by any or all of said first, second, third and fourth cameras;

wherein, responsive to image processing by said image processor of image data captured by said second camera, said electronic control unit is operable to determine objects present in the field of view of said second camera;

wherein, responsive to vehicle data, said electronic control unit determines a vehicle motion vector during driving of the equipped vehicle by a driver of the equipped vehicle;

wherein the vehicle data includes steering information of the equipped vehicle and at least one of (i) speed of the equipped vehicle and (ii) distance traveled by the equipped vehicle;

wherein, during driving of the equipped vehicle by the driver of the equipped vehicle, said electronic control unit determines movement of an object within the field of view of said second camera relative to the equipped vehicle via image processing by said image processor of at least two frames of image data captured by said second camera;

wherein said electronic control unit compares the determined relative movement of the object to the determined vehicle motion vector; and wherein, responsive to a difference between the determined relative movement of the object and the determined vehicle motion vector, said electronic control unit determines a misalignment of said second camera.

17. The vision system of claim 16, wherein the vehicle data is communicated to the electronic control unit via a communication bus of the equipped vehicle and wherein the vehicle data includes geometry of the equipped vehicle.

18. The vision system of claim 17, wherein, responsive to a determined misalignment of said second camera, said electronic control unit is operable to calibrate said second camera.

19. The vision system of claim 17, wherein said electronic control unit compares the determined vehicle motion vector to an object vector determined between a first position of the object in a first frame of image data captured by said second camera and a second position of the object in a second frame of image data captured by said second camera, and wherein said electronic control unit determines a misalignment of said second camera responsive to a difference between a direction or magnitude of the determined vehicle motion vector and a direction or magnitude of the determined object vector.

20. The vision system of claim 17, wherein the field of view of said first camera comprises a field of view rearward of the equipped vehicle, and wherein the field of view of said second camera comprises a field of view sideward of the driver side of the equipped vehicle, and wherein the field of view of said third camera comprises a field of view sideward of the passenger side of the equipped vehicle, and wherein the field of view of said fourth camera comprises a field of view forward of the equipped vehicle, and wherein said second camera is disposed at a driver side exterior rearview mirror assembly of the equipped vehicle, and wherein said second camera comprises a photosensor array having at least 1 million CMOS photosensor elements arranged in rows and columns.

21. The vision system of claim 20, wherein image data captured by cameras of said plurality of cameras is used by a surround view system of the equipped vehicle to generate a birds-eye view of the environment at least partially surrounding the equipped vehicle for display by a display screen of the equipped vehicle that is viewable by the driver of the equipped vehicle, and wherein said electronic control unit is operable to stitch together image data captured at least by said first and second cameras to form a substantially seamless birds-eye view for display by said display screen of the equipped vehicle for viewing by the driver of the equipped vehicle when operating the equipped vehicle.

22. The vision system of claim 21, wherein a kinematic model comprising a bicycle model is used by said electronic control unit to represent vehicle motion, and wherein said kinematic model utilizes at least one of (i) a wheel steering angle of the equipped vehicle, (ii) a wheel pulse of the equipped vehicle, (iii) a heading angle of the equipped vehicle and (iv) translational vehicle motion of the equipped vehicle.

23. A vision system for a vehicle, said vision system comprising:
a plurality of cameras disposed at a vehicle equipped with said vision system;
said plurality of cameras comprising at least (i) a first camera disposed at a rear portion of the equipped vehicle, (ii) a second camera disposed at a driver side portion of the equipped vehicle, (iii) a third camera disposed at a passenger side of the equipped vehicle and (iv) a fourth camera disposed at a front portion of the equipped vehicle;
wherein each of said first, second, third and fourth cameras has a respective field of view exterior of the equipped vehicle;
wherein each of said first, second, third and fourth cameras is operable to capture frames of image data;
an electronic control unit, said electronic control unit comprising an image processor operable to process image data captured by any or all of said first, second, third and fourth cameras;
wherein, responsive to image processing by said image processor of image data captured by said third camera, said electronic control unit is operable to determine objects present in the field of view of said third camera;
wherein, responsive to vehicle data, said electronic control unit determines a vehicle motion vector during driving of the equipped vehicle by a driver of the equipped vehicle;
wherein the vehicle data includes steering information of the equipped vehicle and at least one of (i) speed of the equipped vehicle and (ii) distance traveled by the equipped vehicle;
wherein the vehicle data includes geometry of the equipped vehicle;
wherein the vehicle data is communicated to the electronic control unit via a communication bus of the equipped vehicle;
wherein, during driving of the equipped vehicle by the driver of the equipped vehicle, said electronic control unit determines movement of an object within the field of view of said third camera relative to the equipped vehicle via image processing by said image processor of at least two frames of image data captured by said third camera;
wherein said electronic control unit compares the determined relative movement of the object to the determined vehicle motion vector;
wherein said electronic control unit compares the determined vehicle motion vector to an object vector determined between a first position of the object in a first frame of image data captured by said third camera and a second position of the object in a second frame of image data captured by said third camera, and wherein said electronic control unit determines a misalignment of said third camera responsive to a difference between a direction or magnitude of the determined vehicle motion vector and a direction or magnitude of the determined object vector;
wherein, responsive to a difference between the determined relative movement of the object and the determined vehicle motion vector, said electronic control unit determines a misalignment of said third camera; and
wherein, responsive to a determined misalignment of said third camera, said electronic control unit is operable to calibrate said third camera.

24. The vision system of claim 23, wherein the field of view of said first camera comprises a field of view rearward of the equipped vehicle, and wherein the field of view of said second camera comprises a field of view sideward of the driver side of the equipped vehicle, and wherein the field of view of said third camera comprises a field of view sideward of the passenger side of the equipped vehicle, and wherein the field of view of said fourth camera comprises a field of view forward of the equipped vehicle, and wherein said third camera comprises a photosensor array having at least 1 million CMOS photosensor elements arranged in rows and columns, and wherein said electronic control unit is operable to stitch together image data captured at least by said first and third cameras to form a substantially seamless birds-eye view for display by a display screen of the equipped vehicle for viewing by the driver of the equipped vehicle when operating the equipped vehicle.

25. The vision system of claim 23, wherein image data captured by cameras of said plurality of cameras is used by a surround view system of the equipped vehicle to generate a birds-eye view of the environment at least partially surrounding the equipped vehicle for display by a display screen of the equipped vehicle that is viewable by the driver of the equipped vehicle, and wherein said electronic control unit is operable to stitch together image data captured at least by said first and third cameras to form a substantially seamless birds-eye view for display by said display screen of the equipped vehicle for viewing by the driver of the equipped vehicle when operating the equipped vehicle.

26. The vision system of claim 25, wherein the birds-eye view displayed by said display screen includes a representation of the equipped vehicle, and wherein said third camera is disposed at a passenger side exterior rearview mirror assembly of the equipped vehicle.

27. The vision system of claim 26, wherein a kinematic model comprising a bicycle model is used by said electronic control unit to represent vehicle motion and wherein said kinematic model utilizes at least one of (i) a wheel steering angle of the equipped vehicle, (ii) a wheel pulse of the equipped vehicle, (iii) a heading angle of the equipped vehicle and (iv) translational vehicle motion of the equipped vehicle.

\* \* \* \* \*

UNITED STATES PATENT AND TRADEMARK OFFICE
CERTIFICATE OF CORRECTION

PATENT NO. : 9,701,246 B2
APPLICATION NO. : 14/960834
DATED : July 11, 2017
INVENTOR(S) : James Turk Page 1 of 1

It is certified that error appears in the above-identified patent and that said Letters Patent is hereby corrected as shown below:

In the Specification

Column 3
Line 23, Insert --$x_{ij}, y_{ij}$-- after "motion"

Column 5
Line 61, "WO 2012/1581 67" should be --WO 2012/158167--

Signed and Sealed this
Thirtieth Day of October, 2018

Andrei Iancu
*Director of the United States Patent and Trademark Office*